Jan. 7, 1969     E. HAWLE     3,420,261

PIPE DRILL CLAMP AND ATTACHMENT

Filed Dec. 28, 1966

INVENTOR.
ERWIN HAWLE
BY Kurt Kelman
AGENT

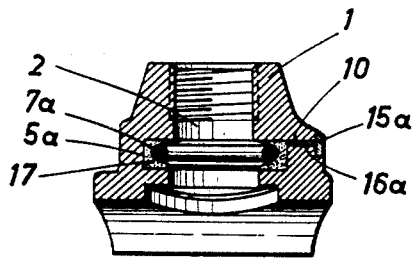
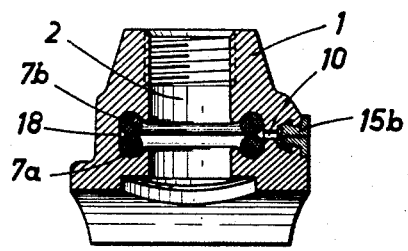
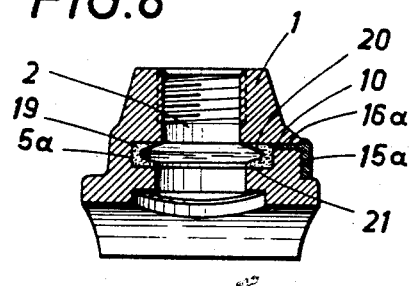
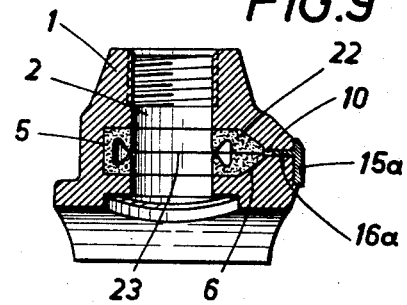
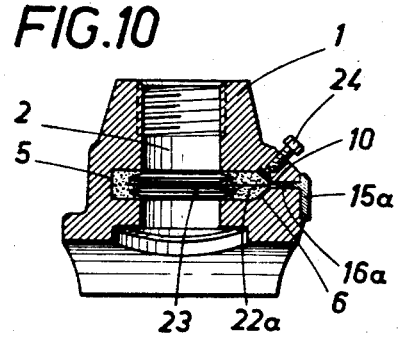
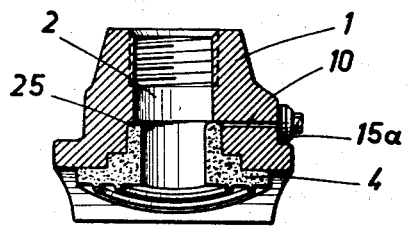
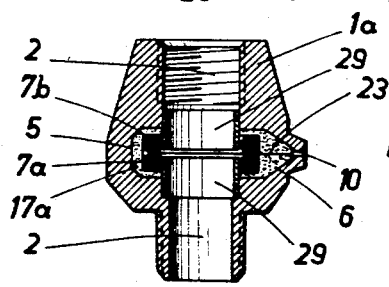

United States Patent Office 3,420,261
Patented Jan. 7, 1969

3,420,261
PIPE DRILL CLAMP AND ATTACHMENT
Erwin Hawle, Wagreinerstrasse 13,
Vocklabruck, Austria
Filed Dec. 28, 1966, Ser. No. 605,372
U.S. Cl. 137—317     23 Claims
Int. Cl. F16k 43/00, 51/00

ABSTRACT OF THE DISCLOSURE

This disclosure relates to a novel pipe drill clamp and to a novel attachment which can be applied to known pipe drill clamps to form the novel pipe drill clamp. The pipe drill clamp comprises a saddle member having a central through bore, which is formed with an enlarged portion. The saddle member is formed with a narrow lateral slit adjacent to said enlarged portion. A resilient annular gasket is seated in said enlarged portion. A gate member consisting of a thin blade removably extends through said slit and cooperates with said gasket to shut off said bore.

---

Pipe drill clamps, which comprise a saddle member, which is adapted to be forced by a clamping bail or the like to the pipe to be drilled and which has a central bore, are known in various designs. The drilling device is screw-threaded into the central bore and the tool of the device is moved through the bore into engagement with the side wall of the pipe. When the pipe has been drilled and the drilling device has been removed, a branch pipe is usually screw-threaded directly into the central bore. To enable a drilling of holes into conduit pipes which are under pressure, the pipe drill clamp must be provided with a shut-off means, which seals the central bore of the saddle member when the pipe has been drilled and the drilling tool has been returned so that the drilling device can then be removed and the branch pipe can be connected without enabling an escape of the fluid which flows in the conduit. Such shut-off means are provided in most cases only in valved pipe drill clamps for valved junctions. Such pipe drill clamps are relatively complicated and expensive and are used only where a separate shut-off valve is required at the drilled portion of the pipe. Another pipe drill clamp has been disclosed, which comprises in its saddle member a gate member, which cooperates with a suitable gasket and serves for a temporary closing of the central bore. The gate member has a hole, which corresponds to the central bore. In the position in which the bore and hole are in register, the gate member protrudes laterally from the saddle member. To close the valve, the gate member is displaced by hammer blows or the like until the solid portion of the gate member is in register with the bore and the hole lies in an extension on the opposite side of the saddle member. The gate member may then be pushed back to its open position. Whereas this valve is simple, the clamp has the disadvantage that the saddle member which must accommodate and guide the gate member has a configuration which complicates its manufacture and that the gate member must always remain in the saddle member so that the cost of the pipe drill clamp is increased. Another disadvantage resides in that the gate member can become seized in the saddle member by corrosion, particularly because such clamps are often embedded in operation in the ground for years, and in such cases the gate member cannot be displaced when the branch conduit should be shut off once more for one reason or the other.

It is an object of the invention to eliminate these disadvantages and provide a pipe drill clamp which is very simple in structure and enables a drilling of conduit pipes which are under pressure and enables a reliable closing of the branch conduit at any time, even after a very long period of operation.

The invention is based on a pipe drill clamp, which comprises a saddle member which is adapted to be forced by a clamping bail or the like against a pipe to be drilled, said saddle member having a central through bore, which is adapted to be shut off by a gate member, which cooperates with a resilient annular gasket accommodated in an enlarged portion of the bore, and the invention resides essentially in that the gate member consists of a thin blade of spring steel or the like, which is adapted to be introduced into the saddle member through a narrow lateral slot thereof and to be entirely removed and, if desired, the lateral slit is adapted to be sealed from the outside. Thus, the gate member is not permanently mounted in the saddle member but is inserted into the same only when the same is to be sealed. Hence, the same gate member can be used for a mulitplicity of pipe drill clamps and cannot become seized in the saddle member by corrosion. To be removable, the gate member must consist of a thin blade because only a very thin slit remaining after the removal of the gate member can be reliably sealed by the annular gasket whereas the known gate member is so thick that the gap left by the gate member when it has been pulled out could not be sealed. Relatively thick gate members have been used so far because it was believed that a thinner gate member could not resist the conduit pressure. It has been found, however, that the bladelike gate member according to the invention, which has, e.g., a thickness of only 0.5 mm., is entirely sufficient when it is made from an appropriate material, such as spring steel or the like. In its closed position, such blade will be somewhat deflected like a diaphragm but this will not adversely affect its sealing action. The thin, bladelike gate member has the additional advantage that it acts during its insertion like a knife and detaches the annular gasket from the saddle member to which the gasket may have become adhered after a long period of operation. Thus, the insertion of the bladelike gate member and the sealing of the bore can be effected at any time without difficulty. As the saddle member does not require means for a permanent accommodation of the gate member, it may have a simple configuration and can easily be manufactured.

In a development of the invention, the enlarged portion of the bore for accommodating the annular gasket consists of a semicircular annular groove, which is extended towards the lateral slit by a pocket having a width which is equal to the diameter of the bottom of the groove. Owing to the provision of this pocket, the thickness of that wall of the saddle member through which the lateral slit extends is minimized so that the lateral slit may be formed by a saw cut, which is subsequently made in the otherwise finished saddle member whereas other methods of forming a slit would result in an excessive width thereof. The pocket affords the further advantage that it can accommodate an additional gasket on the endangered side of the slit. The annular gasket may have an extension, which is supported in the corners of the pocket and, if desired, has a concentric sealing bead, so that the annular gasket will not be displaced when the bladelike gate member is being pulled out.

The gasket may be designed in various ways. For instance, the annular gasket may consist of at least one O-ring and another sealing member, which surrounds said O-ring on the outside and fills the enlarged portion of the bore or the annular groove and, if desired, the lateral pocket. The annular gasket may have at least one inwardly directed sealing lip, which engages the bladelike gate member and/or that wall of the enlarged portion of the bore which is normal to the axis of the bore. By the internal pressure, such a sealing lip is automatically forced against the bladelike gate member or the corresponding wall of the enlarged portion of the bore so that the seal is improved. The annular gasket may comprise two O-rings, which are disposed below and above the lateral slit or the bladelike gate member, respectively, and/or the annular gasket may be formed itself with an intermediate slit for receiving the bladelike gate member. The bore of the saddle member may accommodate at least one supporting bushing, which at least partly overlaps the annular gasket on the inside of the latter to prevent an excessive lateral yielding of the gasket and afford an additional backing surface for the inserted gate member. Finally, a conventional saddle gasket which is provided between the pipe and saddle member may be used as a gasket associated with the gate member if said gasket has an extension, which extends into the bore of the saddle member as far as to the lateral slit so that the free end of this extension constitutes the annular gasket and, is desired, is provided with an inwardly directed sealing lip.

To provide a seal on the outside of the lateral slit, a sealing strip is provided according to the invention, which is adapted to be secured to the saddle member and has an extension which enters the slit. Said sealing strip complements the internal annular gasket and prevents any escape through he lateral slit of the fluid which flows in the conduit. The sealing strip may be screw-connected to the saddle member on the outside of the latter. Alternatively, this sealing strip may consist of resilient material and may be slit for the insertion of the bladelike gate member and held in the saddle member like a snap closure.

It will be particularly suitable, however, if the sealing strip consists of lead or the like, its ends which protrude beyond the sides of the slit are caulked into a suitable recess in the saddle member, and the sealing strip is caulked throughout its length when the bladelike gate member has been removed. This sealing strip is initially held in the recess of the saddle member by its two caulked ends so that it leaves the lateral slit exposed. When the pipe has been drilled, the branch connection has been made, and the gate member has been removed, the sealing strip is caulked also along the length of the slit. Part of the material of the sealing strip will then enter the slit so that the same is reliably sealed. The internal pressure cannot force out the caulked sealing strip because the sealing strip area which is subjected to said pressure in the narrow lateral slit is much too small. To improve the flow of the material of the sealing strip in the lateral slit during caulking, the recess formed in the saddle member for the sealing strip may have a bottom face which slopes upwardly to the lateral slit and the sealing strip may have a wedge-shaped configuration mating said bottom face.

The invention provides further a separate attachment, which is provided with the lateral slit and the annular gasket and adapted to receive the bladelike gate member and to be screw-threaded into the saddle member proper. In this case the pipe drill clamp comprises a simple saddle member and an attachment which is adapted to be screw-threaded into said saddle member. This arrangement affords the advantage that it may be used alone as a shut-off valve when this is desired and conventional pipe drill clamps for non-pressurized pipes can be converted into clamps for drilling pressurized pipes.

Several embodiments of the invention are shown by way of example on the accompanying drawings, in which FIGS. 1, 2 and 3 show a pipe drill clamp, more particularly its saddle member, in a fragmentary sectional view, a sectional view taken on line II—II of FIG. 1 and a horizontal sectional view taken on line III—III of FIG. 1, respectively.

FIGS. 6 to 12 show various modifications of the pipe drill clip in the same showing as in FIG. 2.

Figure 1:
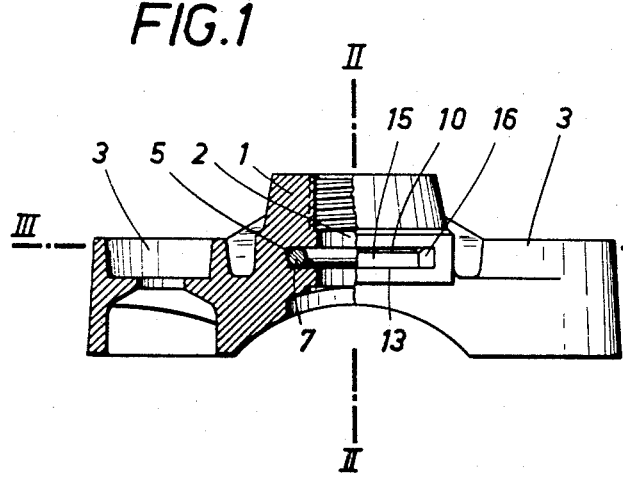
Figure 2:
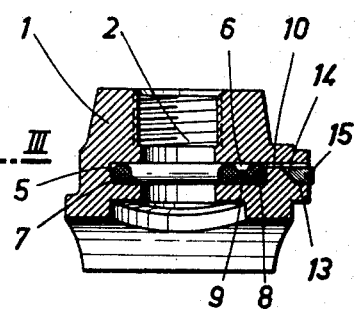
Figure 3:
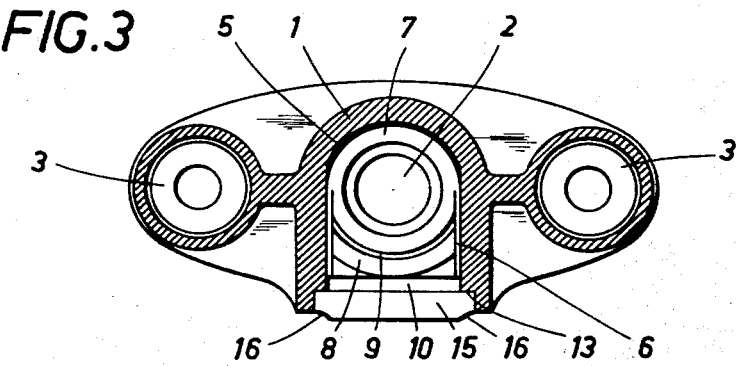
Figure 4:
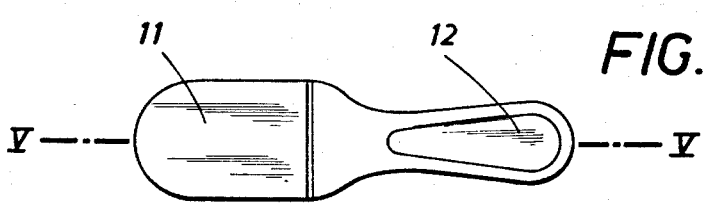
FIGS. 4 and 5 show the gate member alone in a top plan view and in a sectional view taken on line V—V of FIG. 4, respectively.
Figure 5:

The pipe drill clamp comprises a saddle casting 1, which has a central bore 2 and two eye lugs for receiving bolts or screws of a clamping bail or the like, which is not shown. The saddle member 1 is placed on the pipe to be drilled, with a saddle gasket 4 (FIG. 11) interposed between the pipe and the saddle member. The bore 2 has an enlarged portion in the form of a semicircular annular groove 5, which is extended by a pocket 6, which has a width equal to the diameter of the bottom of the groove. This groove accommodates a gasket made of resilient material. The gasket consists of a ring 7 of circular cross-section. On the side facing the pocket, the ring has an extension 9, which is supported at the corners of the pocket and has an additional, concentric sealing bead 8. A lateral slit 10 opens into the pocket 6. When it is desired to seal the bore 2, a gate member in the form of a thin blade 11 of spring steel, provided with a handle 12, can be inserted through the slit 10. Adjacent to the slit, the saddle member 1 is provided on the outside with a recess 13, which is somewhat wider than the slit 10 and has a bottom face 14, which slopes upwardly toward the lateral slit 10. The recess 13 accommodates a sealing strip 15 of lead. This strip is retained in the recess 13 because its ends 16 have been caulked into the recess whereas the strip leaves the slit 10 exposed. When the pipe has been drilled, the branch connection has been made and the temporarily inserted gate member 11 has been removed, the sealing strip 15 is caulked throughout its length. The sloping face 14 causes part of the material of the strip to enter the slit 10 and to act as an additional seal for said slit.

In the embodiment shown in FIG. 6, the gasket consists of an O-ring 7a, which is fitted in the annular groove 5a forming an enlarged portion of the bore. The ring 7a is enclosed on the outside by an additional seal 17, which fills said enlarged portion. The sealing strip for sealing the slit 10 on the outside consists in this case of a rigid strip 15a, which has an extension 16a entering the slit. The strip 15a is secured to the saddle member by screws or other means. FIG. 7 shows a saddle member 1, which has a bore with an enlarged portion 18 in the form of an annular cavity. Two O-rings 7a, 7b are accommodated in said cavity above and below the slit 10, respectively. This slit is sealed on the outside by a sealing strip 15b of resilient material. This strip is held like a snap closure in the saddle member 1 and is provided with a slit for receiving the bladelike gate member 11.

FIG. 8 shows an annular gasket 19, which has two inwardly directed sealing lips 20, 21. Under the line pressure, these sealing lips engage the bladelike gate members or those walls of the enlarged bore portion in the form of an annular groove 5a which are normal to the axis of the bore 2. FIG. 9 shows a modification, in which an annular gasket 22 completely fills the enlarged bore portion, which consists of an annular groove portion 5 and a pocket 6, and said gasket has itself a slit 23 for receiving the bladelike gate member 11. A similar design is shown in FIG. 10, where the annular gasket 22a has a plurality of sealing lips. In this case the basket 22a is provided with a slit 23 and can be compressed by a pressure screw 24 adjacent to the lateral slit 10 when the bladelike gate member 11 has been removed.

According to FIG. 11, the usual saddle gasket 4 is provided with an extension 25, which extends into the bore 2 of the saddle member 1 as far as to the lateral slit 10 and the free end of said extension forms the annular gasket adjacent to the slit. This end portion might be provided with a sealing lip.

FIG. 12 shows a separate attachment 1a, which is provided with a lateral slit 10 and an annular gasket and is screw-threaded into the saddle member proper. In this case, the annular gasket consists of two O-rings 7a, 7b, which are enclosed by a further seal 17a, which is formed with an intermediate slit 23 for receiving the bladelike gate member 11. Two supporting bushings 29 are provided, which are inserted in the bore 2 and partly overlap the annular gasket on the inside. It will be understood that such supporting bushings may be used also with other gaskets or in the saddle member itself and that the attachment 1a may be provided with different gaskets.

What is claimed is:
1. A pipe drill clamp, which comprises
   a saddle member having a central through bore, which is formed with an enlarged portion,
   said saddle member being formed with a narrow lateral slit adjacent to said enlarged portion,
   a resilient annular gasket seated in said enlarged portion, and
   a gate member consisting of a thin blade removably extending through said slit and cooperating with said gasket to shut off said bore.
2. A pipe drill clamp as set forth in claim 1, which comprises means arranged to seal said slit on the outside thereof.
3. A pipe drill clamp as set forth in claim 1, in which said enlarged portion comprises a semicircular groove and
   a pocket which forms an extension of said groove toward said slit,
   said pocket having a width which is equal to the diameter of the bottom of said groove.
4. A pipe drill clamp as set forth in claim 3, in which said pocket is formed with corners and
   said gasket has an extension which is supported in the corners of the pocket.
5. A pipe drill clamp as set forth in claim 4, in which said extension of the gasket has a concentric sealing bead.
6. A pipe drill clamp as set forth in claim 3, in which said gasket consists of at least one O-ring and another sealing member, and
   said other sealing member surrounds said O-ring on the outside and fills said groove.
7. A pipe drill clamp as set forth in claim 6, in which said other sealing member fills also said pocket.
8. A pipe drill clamp as set forth in claim 1, in which said gasket consists of at least one O-ring and another sealing member, and
   said other sealing member surrounds said O-ring on the outside and fills at least a part of said enlarged portion of said bore.
9. A pipe drill clamp as set forth in claim 1, in which said saddle member has a sealing surface which is normal to the axis of said bore and defines part of said enlarged portion,
   said gate member has a sealing surface facing said sealing surface of said saddle member,
   said gasket has inwardly directed sealing lip means, and
   said sealing lip means engages at least one of said sealing surfaces.
10. A pipe drill clamp as set forth in claim 1, in which said gasket comprises two O-rings, which are disposed on opposite sides of said slit and gate member.
11. A pipe drill clamp as set forth in claim 1, in which said gasket is formed with a slit aligned with said slit in said saddle member, and
    said gate member extends through said slit in said gasket.
12. A pipe drill clamp as set forth in claim 11, which comprises a pressure screw, which is mounted in said saddle member adjacent to said gasket and operable to compress the same.
13. A pipe drill clamp as set forth in claim 1, which comprises
    at least one supporting bushing, which is accommodated in said bore and at least partly overlaps said gasket on the inside of the latter.
14. A pipe drill clamp as set forth in claim 1, which comprises
    a saddle gasket, which extends at that end of said saddle member which is engageable with a pipe to be drilled, and into said bore as far as to said slit, and
    said saddle gasket has a free end portion which constitutes said annular gasket.
15. A pipe drill clamp as set forth in claim 14, in which said free end portion of said saddle gasket has an inwardly directed sealing lip.
16. A pipe drill clamp as set forth in claim 1, which comprises a sealing strip, which is secured to said saddle member and seals the lateral slit on the outside thereof.
17. A pipe drill clamp as set forth in claim 16, in which said sealing strip is detachably secured to said saddle member.
18. A pipe drill clamp as set forth in claim 16, in which said sealing strip has an extension which enters said slit.
19. A pipe drill clamp as set forth in claim 16, in which said sealing strip is slit and consists of resilient material, and
    said saddle member is formed with projections retaining said sealing strip.
20. A pipe drill clamp as set forth in claim 16, in which said sealing strip consists of lead and extends longitudinally beyond said slit at both ends of the length thereof, and
    said saddle member is formed with a recess which accommodates said sealing strip and is open to said slit.
21. A pipe drill clamp as set forth in claim 20, in which said recess has a base surface which is upwardly inclined toward said slot and
    said sealing strip has a wedge shape and conforms to said base surface.
22. A pipe drill clamp as set forth in claim 1, in which said saddle member comprises a main part and an attachment screw-threaded into said main part, and
    said attachment is formed with said lateral slit and said enlarged portion of said bore.
23. A pipe drill clamp attachment which comprises
    a tubular member having an external screw thread and a central through bore, which is formed with an enlarged portion,
    a resilient annular gasket seated in said enlarged portion,
    said tubular member being formed with a narrow lateral slit adjacent to said enlarged portion, and
    a gate member consisting of a thin blade removably extending through said slit and cooperating with said gasket to shut off said bore.

References Cited

UNITED STATES PATENTS

| 582,230 | 5/1897 | Richardson | 137—318 |
| 1,898,935 | 2/1933 | Brandriff | 137—316 |
| 3,104,456 | 9/1963 | Powell | 137—318 X |

FOREIGN PATENTS

| 813,484 | 2/1937 | France. |

WILLIAM S. BURDEN, *Primary Examiner.*